Aug. 25, 1936.   P. E. BAKER   2,052,524
FULL FLOATING AXLE ASSEMBLY
Original Filed Jan. 20, 1931

INVENTOR.
PAUL E. BAKER
BY
John P. Tarbox
ATTORNEY.

Patented Aug. 25, 1936

2,052,524

UNITED STATES PATENT OFFICE 2,052,524

FULL FLOATING AXLE ASSEMBLY

Paul E. Baker, Detroit, Mich., assignor to Budd Wheel Company, Philadelphia, Pa., a corporation of Pennsylvania Original application January 20, 1931, Serial No. 509,967. Divided and this application November 2, 1935, Serial No. 47,954

11 Claims. (Cl. 308—211)

My invention relates to the art of wheels and axles and it has been a particular object thereof to improve hub bearing arrangements in connection with axles of the full floating type. A more particular object of my invention has been to design a hub and mounting therefor for use in connection with a full floating axle which is adapted to have mounted thereon wheel bodies manufactured for use in connection with axles and mountings of other types. Such wheels are usually of too small inner diameter to be received upon hubs designed for mounting upon full floating axles. I have devised a hub and axle connection which is more compact than those of the prior art and which retains its characteristics of simplicity and strength. The present application is a division of my prior copending application, Ser. No. 509,967, and is directed particularly to the bearing structure itself.

Other objects and advantages of my invention relate to the production of a full floating hub and axle bearing arrangement which is of simple form and in which the parts can be readily assembled and retained in their assembled relationship.

Figure 1:
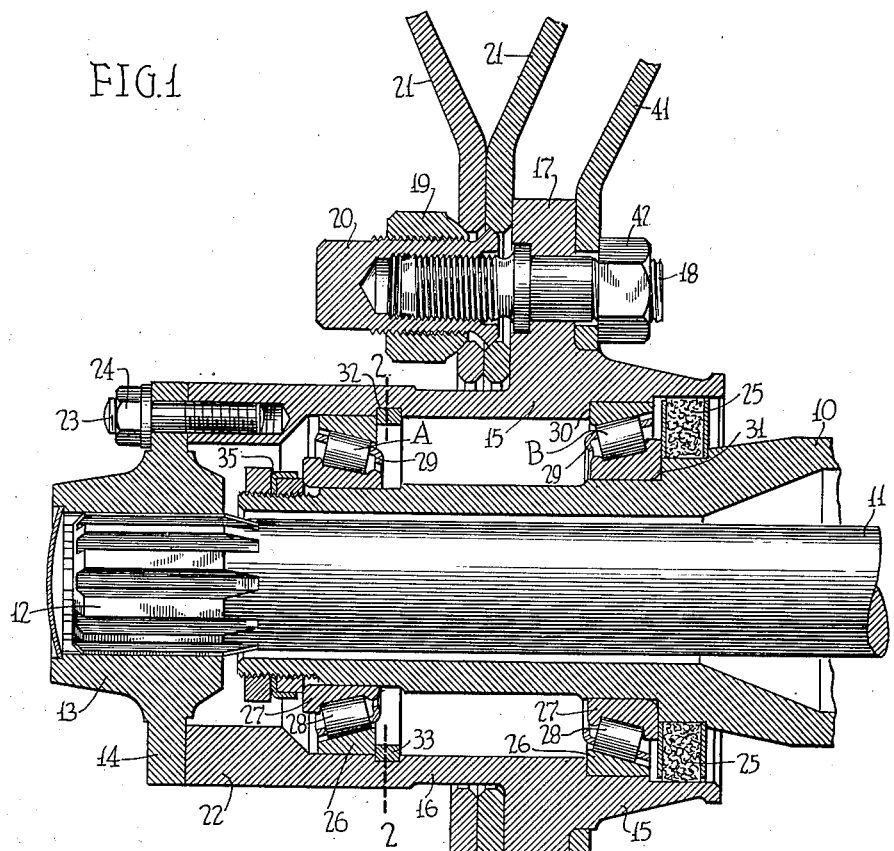

Other objects and advantages of my invention will be apparent from a reading of the sub-joined specification in the light of the attached drawing, in which, Figure 1 is a central axial sectional view through my improved axle, hub and wheel illustrating my bearing arrangement and hub and axle interconnection.

Figure 2:
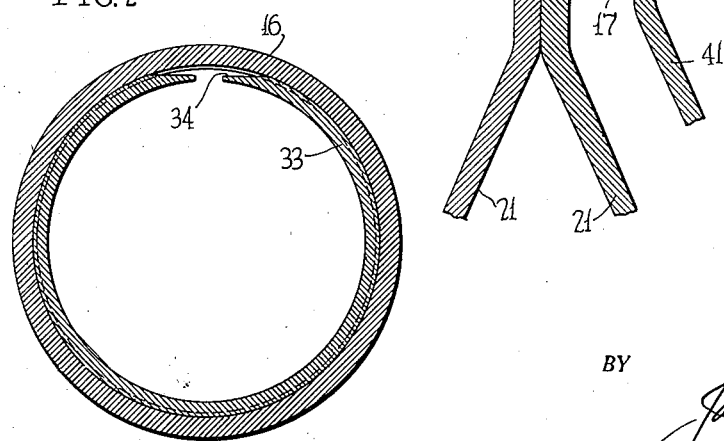

Figure 2 is a transverse sectional view on the line 2—2 of Figure 1.

Referring to the drawing by reference characters, the numeral 10 indicates an axle housing adapted to receive a driving axle 11 which has splines on its outer end as indicated at 12. A sleeve cap or other member 13 is splined complementally, to the splines 12, upon the axle and is adapted to be received upon the axle splines. This sleeve is provided upon its outer periphery with a radially extending flange 14 adapted to be secured to a hub 15 which in turn mounts the vehicle wheel bodies. The main body of the hub 15 consists of an annular body portion 16 which is provided centrally with a radially extending flange 17 against which a wheel body 21 is adapted to be seated at one side and against which, at the other side, is seated a brake drum head 41. A plurality of studs 18 project axially outwardly from the hub flange and are adapted to coact with suitable nuts 19 and 20 of known type in securing a wheel body in place, the wheel body in the present case consisting of a pair of duplicate discs 21 provided with suitable apertures adapted to receive the studs 18. The studs 18 have additional nuts 42 at their opposite ends arranged for securing the brake drum head 41 to the hub flange 17.

So far as described above, my axle and hub are of conventional design. My invention relates to these parts and effects a more compact arrangement thereof than any known in the prior art in order that wheel bodies 21 of very small inner circumference may be received over the annular body 16 of the hub and mounted against its flange 17. In order to effect such an arrangement I have provided an annular boss 22 extending inwardly from the outer axial extremity of the hub body 16, a plurality of threaded studs 23 being received within this outer axial end of the hub body and adapted to coact with suitable nuts 24 received upon the threaded outer ends of these studs in clamping and/or connecting the flange 14 to the outer end portion 22 of the hub. By this arrangement, I am enabled to bolt the radial flange 14 to the main body of the hub without employing any projections extending beyond the main body of the hub and it may accordingly be formed with an extremely small outer diameter adapted to receive wheel bodies having small inner diameters.

My invention also contemplates the use of a novel bearing mounting arrangement made necessary by this compact arrangement of parts. The two bearing assemblies constituting the full floating mounting are identical except that the outer assembly A is smaller than the inner, each of these assemblies consisting of an outer raceway 26 and an inner raceway 27 adapted to receive rollers 28 and a suitable retaining ring 29. A shoulder 30 is provided upon the inner circumference of the hub body in the axial neighborhood of the flange 17, this shoulder being adapted to act as an outer bearing abutment for the inner bearing assembly B by reason of the abutment of the outer axial end of the outer raceway 26 against the shoulder. The axle housing 10 is provided with a shoulder 31 against which the inner axial end of the inner raceway 27 of the inner bearing assembly B is adapted to abut to effect an inner axial abutment for this bearing assembly.

The outer bearing assembly A is located by means of a snap ring 33 which enters an annular groove 32 in the body of the hub. This snap ring is provided with means shown as a suitable cutaway portion 34 adjacent its split ends adapted to receive a screw driver or other suitable tool.

The outer bearing assembly is held against this snap ring by means of a suitable nut and locking assembly 35 adapted to be received upon the threaded outer end of the axle housing 10. Upon the housing 10, and interposed between the hub 15 and the housing, is a suitable grease washer 25 which prevents any throwing of oil, etc. into the brake drum and assists in retaining the lubricants within the bearings.

It will be noted that the hub is of progressively decreasing inner circumference from its axial inner end toward its axial outer end and that the axle housing is of progressively decreasing outer circumference in this same direction. As a consequence of this fact both bearings may be assembled from the inner end of the hub, the outer bearing assembly A being first inserted, the snap ring following this assembly and holding it in place, and the inner bearing assembly B thereafter being inserted until it abuts the shoulder 30. The hub and bearing assembly is next telescoped with the axle housing, being pushed inwardly over this housing until the inner raceway 27 of the inner bearing assembly abuts the shoulder 31 of the housing. The nuts 35 are thereafter brought home to locate the outer bearing assembly positively against the snap ring 33. The splined sleeve 13, which effects a driving connection between the hub and axle is next inserted over the splined portion 12 of the drive shaft 11 and secured thereto by means of nuts 24.

It will thus be seen that I have adequately achieved the objects of my invention. I have not only invented a hub which is of extremely small outer diameter which is thus capable of receiving wheel bodies of small inner diameter, but I have also devised a full floating bearing arrangement for such a hub which is sturdy, compact and capable of rapid assembly and can mount the small inner diameter front wheels upon the full floating axle and bearing assembly for live axle or driven wheels.

Modifications will be obvious to those skilled in the art and I do not therefore wish to be limited except by the terms of my sub-joined claims as interpreted in the light of the prior art and the generic spirit of my invention.

What I claim is:

1. In a motor vehicle, a stationary trunnion, a rotatable member sleeved upon the trunnion and having a bore of larger cross sectional dimension at one end than at the other, a pair of axially spaced bearings between the trunnion and rotatable member, each having an overall dimension greater than the dimension of the bore at its smaller end, and being adapted for insertion in the bore through the larger end to positions adjacent opposite ends of the member, and means associated with the rotatable member for engagement with the outermost bearing to hold the same in position.

2. In a motor vehicle, a wheel hub having an opening to receive an axle, a bearing adapted for insertion in the opening from the inner side of the hub to a position adjacent the outer side of the hub, and a split ring retainer for the bearing removably seated in an annular groove interiorly of the hub and provided with a shouldered portion for the engagement of a tool for moving the ring out of the seat.

3. In a motor vehicle, inner and outer relatively rotatable members, the interior of said outer member being smaller at one end than at the other, a bearing between the members, said bearing being of greater diameter than the smaller interior dimension of said outer member, a retainer on one member for engagement with one side of the bearing, and a snap ring retainer seated within a groove in the other member for engagement with the opposite side of the bearing.

4. In a motor vehicle, an axle housing, a drive axle within the housing, a rotatable wheel hub sleeved on the housing and drive connected with the shaft, a pair of axially spaced bearings between the hub and housing inwardly of the connection between the hub and shaft, the hub receiving the bearings from the inner end thereof, and locating means to hold one of the bearings near the outer end of the hub and against inward axial displacement.

5. In a drive axle assembly for motor vehicles, an axle housing for a drive shaft, a wheel hub sleeved on the housing, a bearing interposed between the hub and housing, an end portion integral with the hub and extending radially inward beyond the perimeter of the bearing for connection with said shaft, and means retaining said bearing against axial movement away from said end portion, said means being carried by the hub and movable out of the path of said bearing.

6. In a motor vehicle, a wheel hub having an opening to receive an axle, said opening being of smaller dimensions at its outer end, a bearing of larger diameter than the smaller portion of said opening adapted for insertion in the opening from the inner side of the hub to a position adjacent the outer side of the hub, and a split ring retainer for the bearing removably seated in an annular groove interiorly of the hub.

7. In a motor vehicle, an axle housing, a drive shaft within the housing, a wheel hub recessed from its inner end and rotatably mounted upon the housing, a drive connection between said shaft and the outer end of the hub, a pair of axially spaced bearings between the hub and housing receivable within the hub from its inner end, and locating means receivable within the hub after one of the bearings is inserted and removably associated with the hub near its outer end to hold said bearing against inward displacement.

8. A full floating bearing assembly for vehicle wheels comprising in combination, a vehicle hub having an inner periphery successively stepped downwardly from its axial inner end to its axial outer end to provide successive zones for the reception of bearings, whereby the inner surface of said hub presents no projections obstructing the insertion of successive bearing assemblies within said hub from its inner axial extremity, inner and outer bearing assemblies received within said hub, and an axle housing adapted to coact with said hub in locating said bearings.

9. A full floating bearing assembly for vehicle wheels comprising in combination, a vehicle hub having an inner periphery successively stepped downwardly from its axial inner end to its axial outer end to provide successive zones for the reception of bearings, whereby the inner surface of said hub presents no projections obstructing the insertion of successive bearing assemblies within said hub from its inner axial extremity, inner and outer bearing assemblies received within said hub, means coacting with said hub to locate the outer bearing assembly, an axle housing provided with an abutment adapted to coact with an abutment upon the inner periphery of the hub to locate the inner bearing assembly, and means coacting with said axle housing and said first-named means to locate the outer axial bearing assembly.

10. A full floating bearing assembly for vehicle wheels comprising in combination, a vehicle hub having an inner periphery successively stepped downwardly from its axial inner end to its axial outer end to provide successive zones for the reception of bearings, whereby the inner surface of said hub presents no projections obstructing the insertion of successive bearing assemblies within said hub from its inner axial extremity, inner and outer bearing assemblies received within said hub, a locking ring coacting with said hub to locate the outer bearing assembly, an axle housing provided with an abutment adapted to coact with an abutment upon the inner periphery of the hub to locate the inner bearing assembly, and means coacting with said axle housing and said locking ring to locate the outer axial bearing assembly.

11. A bearing assembly for a full floating axle, comprising in combination, a wheel, an axle housing, having exterior threads on the end thereof, a driving axle within said housing, inner and outer bearings for said hub, said inner bearing being located axially by a shoulder on said axle housing and a shoulder within said hub, said outer bearing being located by a threaded collar on said axle housing and a removable locating ring fitting in an annular groove in said hub axially inward of said outer bearing.

PAUL E. BAKER.